United States Patent
Pechtold et al.

(10) Patent No.: US 8,454,058 B2
(45) Date of Patent: Jun. 4, 2013

(54) HIGH PRESSURE FITTING FOR HYDROGEN APPLICATIONS

(75) Inventors: Rainer Pechtold, Hunstetten (DE); Jorg Schulze, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 12/852,929

(22) Filed: Aug. 9, 2010

(65) Prior Publication Data
US 2012/0032438 A1 Feb. 9, 2012

(51) Int. Cl.
*F16L 19/06* (2006.01)
(52) U.S. Cl.
USPC .......................................... 285/356; 285/355
(58) Field of Classification Search
USPC ................. 285/353, 348, 355, 356, 386, 389
See application file for complete search history.

(56) References Cited

U.S. PATENT DOCUMENTS

| | | | | |
|---|---|---|---|---|
| 2,726,104 A | * | 12/1955 | Boitnott et al. | 285/98 |
| 3,695,642 A | * | 10/1972 | DeWoody | 285/148.3 |
| 4,191,408 A | * | 3/1980 | Acker | 285/113 |
| 4,586,718 A | * | 5/1986 | Stephenson et al. | 277/422 |
| 5,201,835 A | * | 4/1993 | Hosie | 277/314 |
| 5,553,901 A | * | 9/1996 | Serot | 285/340 |
| 5,673,945 A | * | 10/1997 | Olson | 285/322 |
| 7,090,222 B2 | * | 8/2006 | Watanabe et al. | 277/549 |
| 7,240,904 B2 | * | 7/2007 | Droscher et al. | 277/349 |

FOREIGN PATENT DOCUMENTS

WO 2009/100898 A1 8/2009

* cited by examiner

*Primary Examiner* — James Hewitt
(74) *Attorney, Agent, or Firm* — Dinsmore & Shohl LLP

(57) ABSTRACT

High pressure hydrogen fittings and methods of sealing a pipe to a valve body. In one embodiment, the high pressure hydrogen fitting includes a pipe having flange near one end; a nut surrounding the pipe on a low pressure side of the flange, the nut having threads mating with threads on a valve body; a lip seal surrounding the pipe on a high pressure side of the flange, the flange supporting the lip seal, the lip seal pointing toward the valve body, the lip seal having a cylindrical sealing surface, the cylindrical seal surface engaging the valve body; wherein when the pipe containing hydrogen is connected to a valve body, a seal is maintained at a pressure of up to about 87.5 MPa.

16 Claims, 6 Drawing Sheets

US 8,454,058 B2

HIGH PRESSURE FITTING FOR HYDROGEN APPLICATIONS

BACKGROUND OF THE INVENTION

This invention relates generally to high pressure pipes, and more particularly to fittings to connect pipes to valve bodies.

A fitting connects a pipe to a body, e.g., a valve assembly. The fitting also acts as a seal so that the material in the pipe/body does not escape into the environment.

Hydrogen storage systems are being developed for automotive applications. These storage systems have several important sealing requirements, which are challenging because of the hydrogen molecule's small size. The fitting has to operate under high pressure conditions, e.g., up to about 875 bar (87.5 MPa). It also has to operate at low temperatures, e.g., down to about −40° C., as well as at temperatures up to about 85° C. Because the fitting will be mounted under the body of the vehicle, it will be exposed to corrosive materials. In addition, the fitting should be able to be opened and closed several times. It also should be able to operate when the pipe and valve body are made of different materials, e.g., when the pipe is made of stainless steel and the valve body is made of aluminum.

WO 2009/100898 A1 describes one type of fitting for a valve assembly. There is a valve body 10. A pipe 15 is connected to the valve body 10. There is a seal case 20 attached to the pipe 15 by weld 25. The seal case 20 forms a flange around the pipe 15 that supports seal 42. The nut 30 fits into the valve body 10. The nut 30 is on the low pressure side of the flange. There is a retaining washer 35 between the nut 30 and the seal case 20. The seal 42 between the valve body 10 and the seal case 20 is provided by a solid ring made of poly ether ether ketone (PEEK). For low temperature applications, seals made of most elastomers are not suitable because they become hard and brittle, and plastic materials such as PEEK have to be used. However, plastic materials have limited elasticity, leading to the danger of increased leaks at temperatures below −40° C. In addition, the contact area at the body is conical, making it difficult to keep tight tolerances.

Therefore, it would be desirable to have a fitting which provides a good seal for hydrogen, including at low temperatures.

SUMMARY OF THE INVENTION

The present invention meets this need. One aspect of the invention involves a high pressure hydrogen fitting. In one embodiment, the high pressure hydrogen fitting includes a pipe having flange near one end; a nut surrounding the pipe on a low pressure side of the flange, the nut having threads mating with threads on a valve body; a lip seal surrounding the pipe on a high pressure side of the flange, the flange supporting the lip seal, the lip seal pointing toward the valve body, the lip seal having a cylindrical sealing surface, the cylindrical seal surface engaging the valve body; wherein when the pipe containing hydrogen is connected to a valve body, a seal is maintained at a pressure of up to about 87.5 MPa.

Another aspect of the invention involves a method of sealing a pipe to a valve body. In one embodiment, the method includes providing a pipe having a flange near one end, a nut surrounding the pipe on a low pressure side of the flange, the nut having threads mating with threads on the valve body, and a lip seal surrounding the pipe on a high pressure side of the flange, the flange supporting the lip seal, the lip seal pointing toward the valve body, the lip seal having a cylindrical sealing surface; and inserting the pipe into the valve body and engaging the threads on the nut with the threads on the valve body, the cylindrical seal surface engaging the valve body to form a seal, the seal capable of withstanding a pressure of up to about 87.5 MPa without hydrogen leakage.

DETAILED DESCRIPTION OF THE INVENTION

Figure 1:
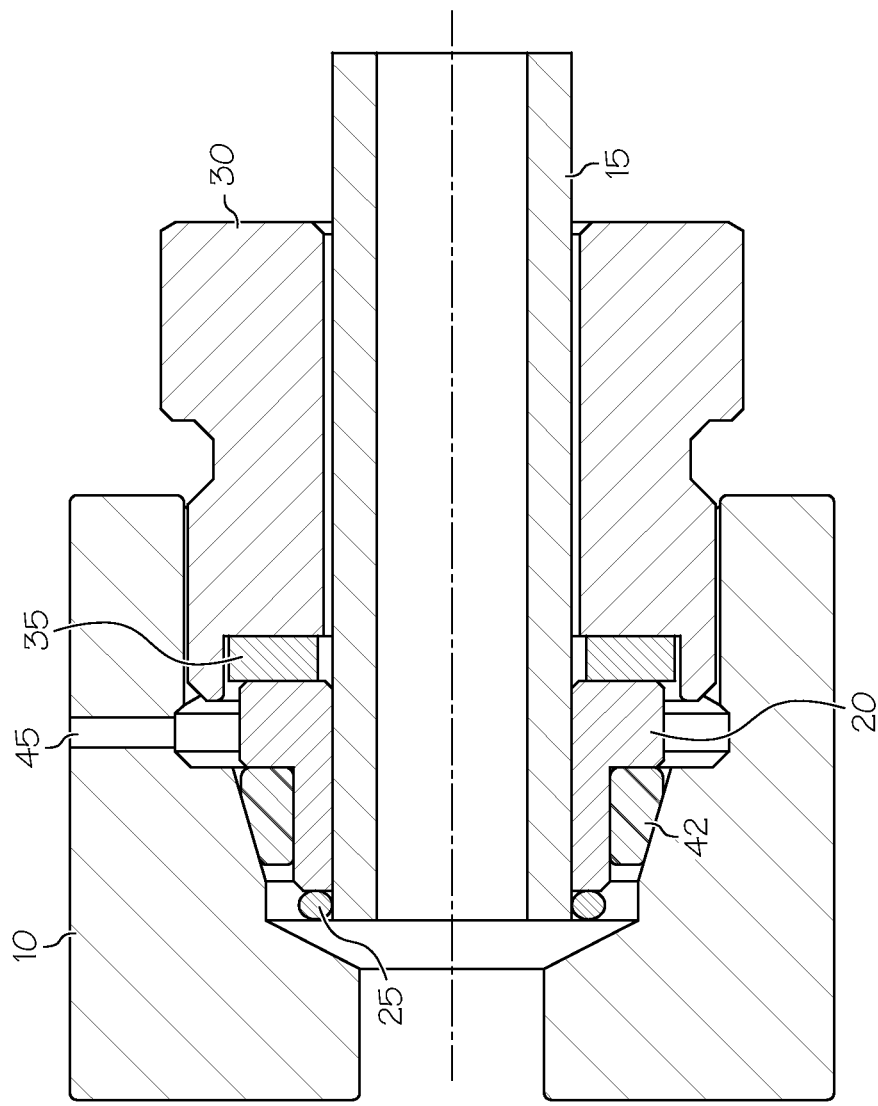
FIG. 1 is an illustration of one embodiment of a prior art hydrogen fitting.
Figure 2C:
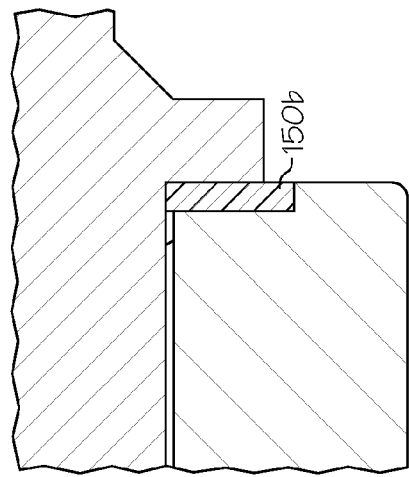
FIGS. 2A-C are illustrations of fittings according to various embodiments of the present invention.
Figure 2A:
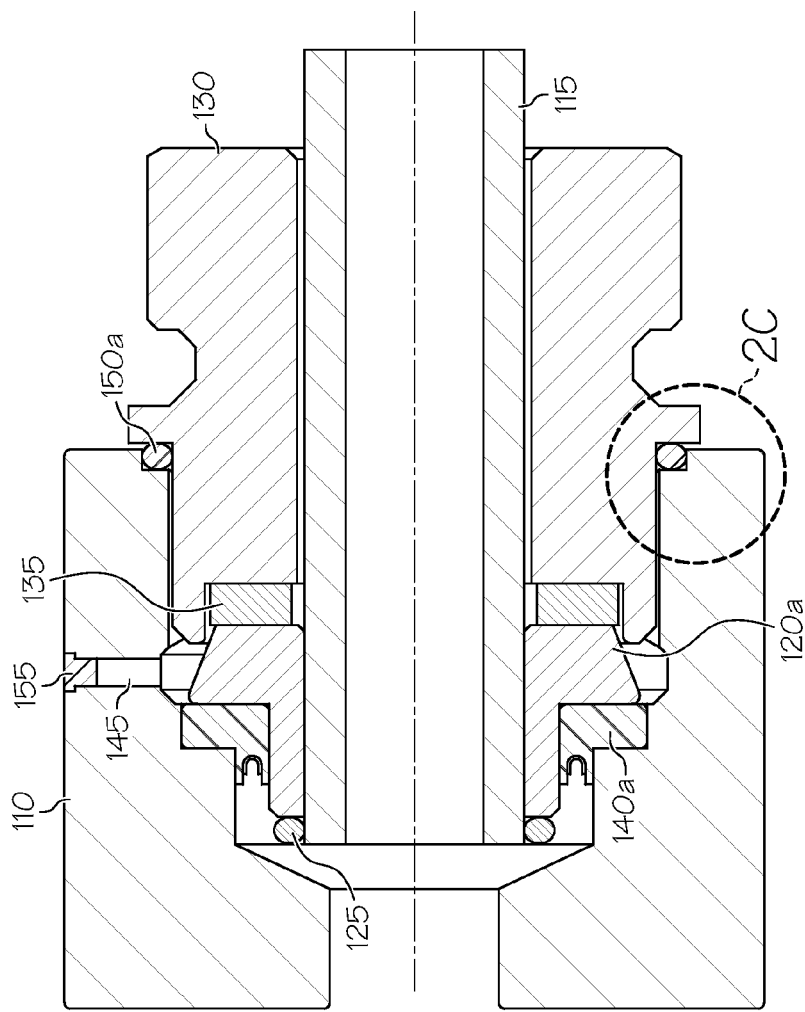
Figure 2B:
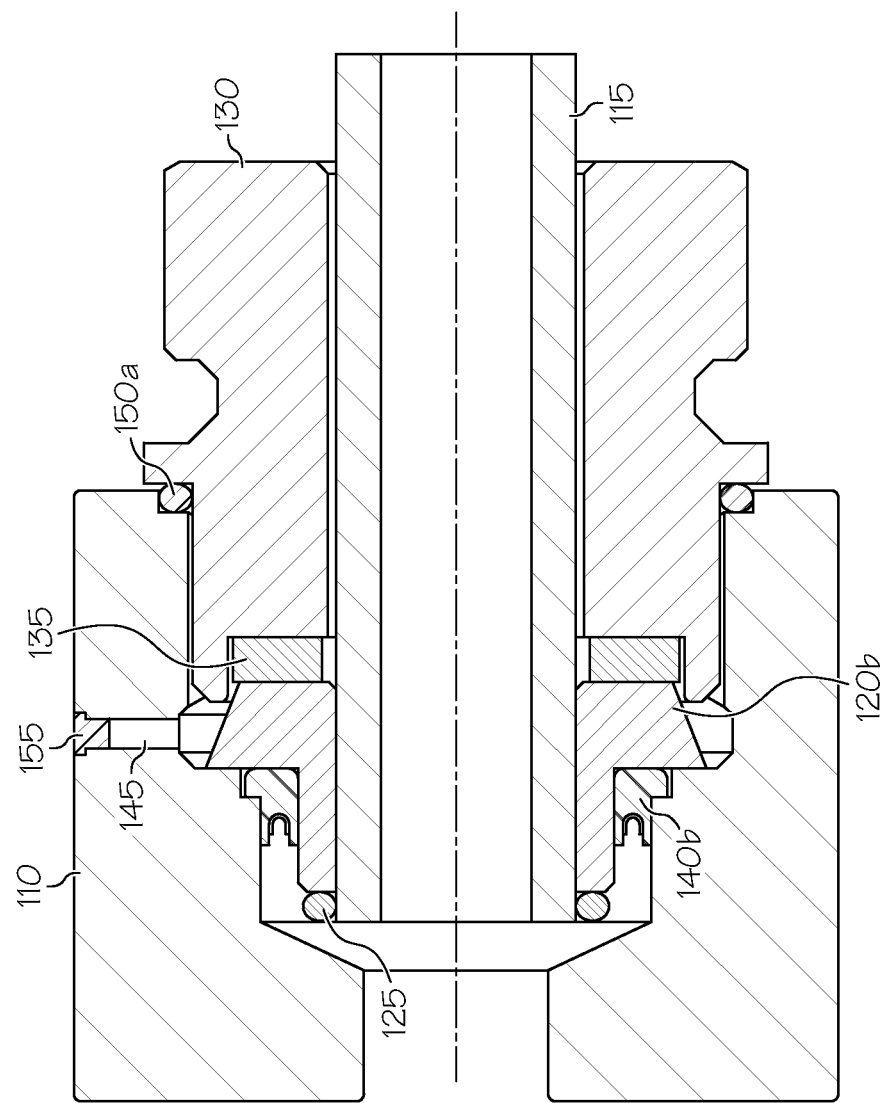

As shown in FIGS. 2A-C, there is a valve body 110 with a pipe 115 which is to be connected to it. The seal case 120a is attached to the pipe 115 by weld 125. The seal case forms a flange around the pipe that is used to support the seal as discussed below. The nut 130 is inserted into the valve body, and it is on the low pressure side of the flange. There is a retaining washer 135 between the nut 130 and the seal case 120. The retaining washer helps to prevent the nut from turning once it is seated.

The seal between the valve body 110 and the seal case 120 is provided by a spring energized lip seal 140a. The spring energized lip seal 140a has a cylindrical sealing surface. It is easier to maintain tight tolerances on cylindrical sealing surfaces than on conical sealing surfaces.

In this embodiment, the spring energized lip seal has a lip seal portion and a base portion. However, other arrangements of lip seals could be used depending on the particular application.

The lip seal portion points toward the valve body. Both the lip seal portion and the base portion have cylindrical sealing surfaces.

The spring energized lip seal 140a is made of a plastic material. The selection of the plastic will depend on the particular application. The plastic should work over the desired temperature range without becoming too hard and it should be flexible enough to seal at the operating temperatures. Suitable plastic materials include, but are not limited to, polytetrafluoroethylene (PTFE) and ultra-high molecular weight polyethylene (UHMW-PE). The elasticity is provided by a separate spring.

The different seal principle of the lip seal affects the required torque for sealing. If the torque at the thread of the fitting is high, as in WO2009/100898, the aluminum threads can be damaged, or the number of times the fitting could be tightened could be very limited. However, with the lip seal, the torque can be relatively low, which would improve durability.

The lip seal 140a shown in FIG. 2A differs from the lip seal 140b of FIG. 2B because the base portion of the lip seal 140a is wider than the base portion of the lip seal 140b. The seal case 120a in FIG. 2A stops at the lip seal 140a, while the seal case 120b in FIG. 2B stops at the valve body 110. A portion of the flange engages the surface of the valve body as shown in FIG. 2B, while in FIG. 2A, it does not.

Additional optional features relate to corrosion protection for the fitting. For example, when the valve body is made of aluminum and the pipe is made of stainless steel, corrosion protection may be needed. A corrosion protection seal 150 can be added at the outer end of the fitting (at the opposite end of the threads from the seal case and retaining washer). The corrosion protection seal 150 is designed to prevent corrosives from entering the screw area of the fitting.

The presence of the corrosion protection seal 150 creates a volume between the lip seal 140a (the main seal of the fitting) and the corrosion protection seal 150. If the hydrogen is under high pressure for a long period, the very small permeation, which exists in all seals, will set the volume under high pressure. This could blow out the corrosion protection seal. On the other hand, if the pressure is reduced rapidly, the lip seal could be forced to move inside. As a result of these problems, the prior art recommendation was not to use two seals in a row. However, this precludes using a seal for corrosion protection.

However, a material having specified properties can be used for the corrosion protection seal. The material should operate over a wide range of temperatures (e.g., about −40° C. to about 85° C., up to about −80° C. to about 85° C.), prevent water penetration, and be permeable to hydrogen. When the material meets these conditions, high pressure will not build up between the seals. One example of a suitable material is silicone. It has a wide operating temperature range, it prevents water penetration, and it is permeable to hydrogen.

FIGS. 2A-C show two different types of corrosion protection seals. In FIGS. 2A-B, an O-ring 150a is used, while in FIG. 2C, a flat seal 150b is used. Seals having other shapes could also be used, as is known by those of skill in the art.

If a valve body 110 includes a vent 145, this opening should also be sealed from corrosion. A plug 155 can used. The plug should be made of a material meeting the criteria for the corrosion protection seal discussed above, e.g., silicone.

Desirably, the fitting can operate at temperature ranges of about −40° C. to about 85° C., or about −50° C. to about 85° C., or about −60° C. to about 85° C., or about −70° C. to about 85° C., or about −80° C. to about 85° C.

Figure 3:
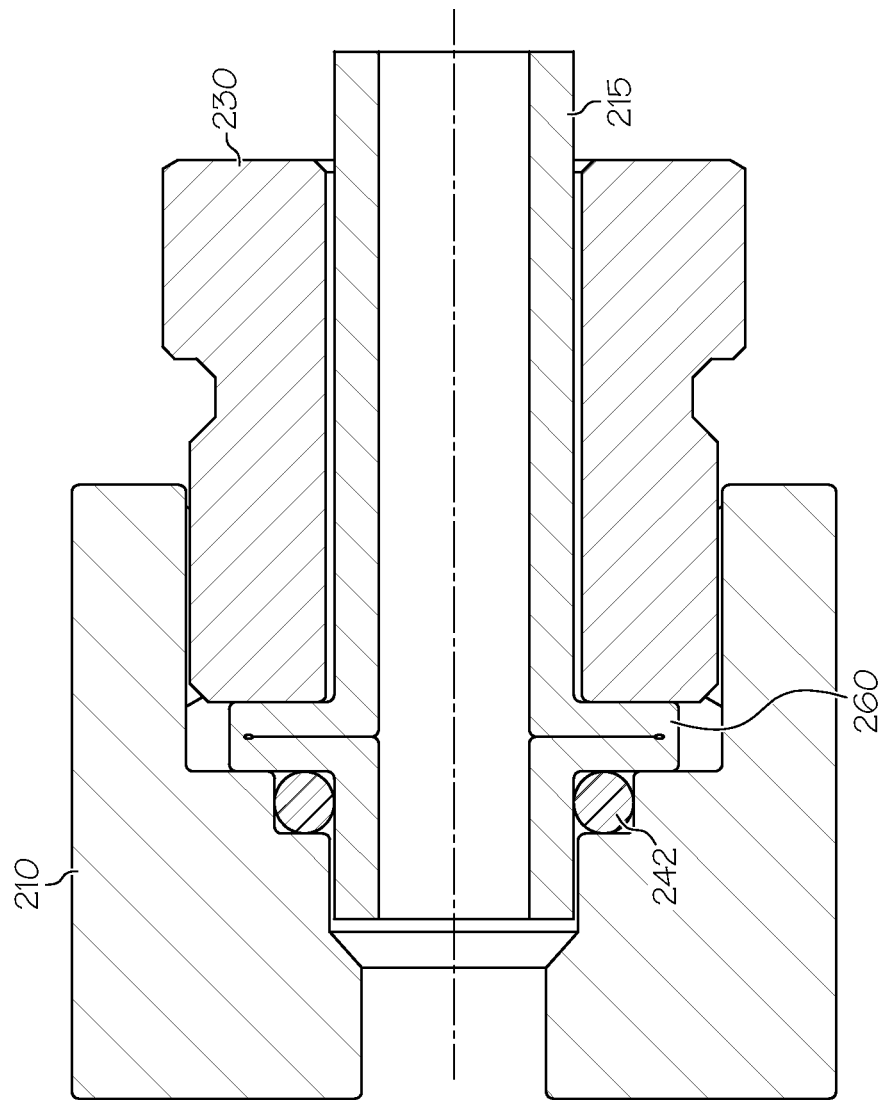
FIG. 3 is an illustration of another embodiment of a hydrogen fitting.

An alternate embodiment of a fitting is shown in FIG. 3. The valve body 210 receives the pipe 215. The end of the pipe 215 is bulge formed which forms a flange 260 near the end. There is an O-ring seal 242 between the pipe/flange 215/260 and the valve body 210. The pipe is easily formed and inexpensive for high volume production. The seal is completely removed from the gas stream. The number of parts is reduced, and the seal can be easily replaced. Optionally, a retaining washer can also be used in this embodiment, if desired.

Figure 4A:
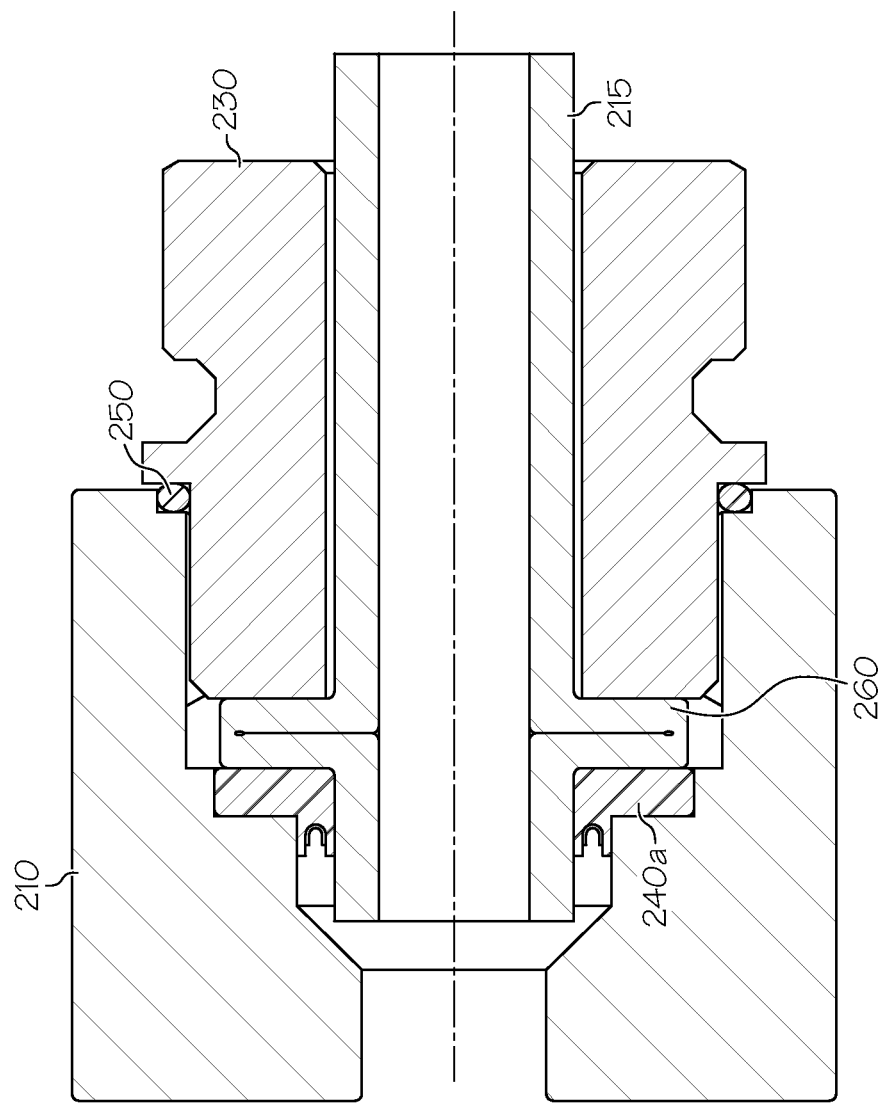
FIGS. 4A-B are illustrations of fittings according to various embodiments of the present invention.
Figure 4B:
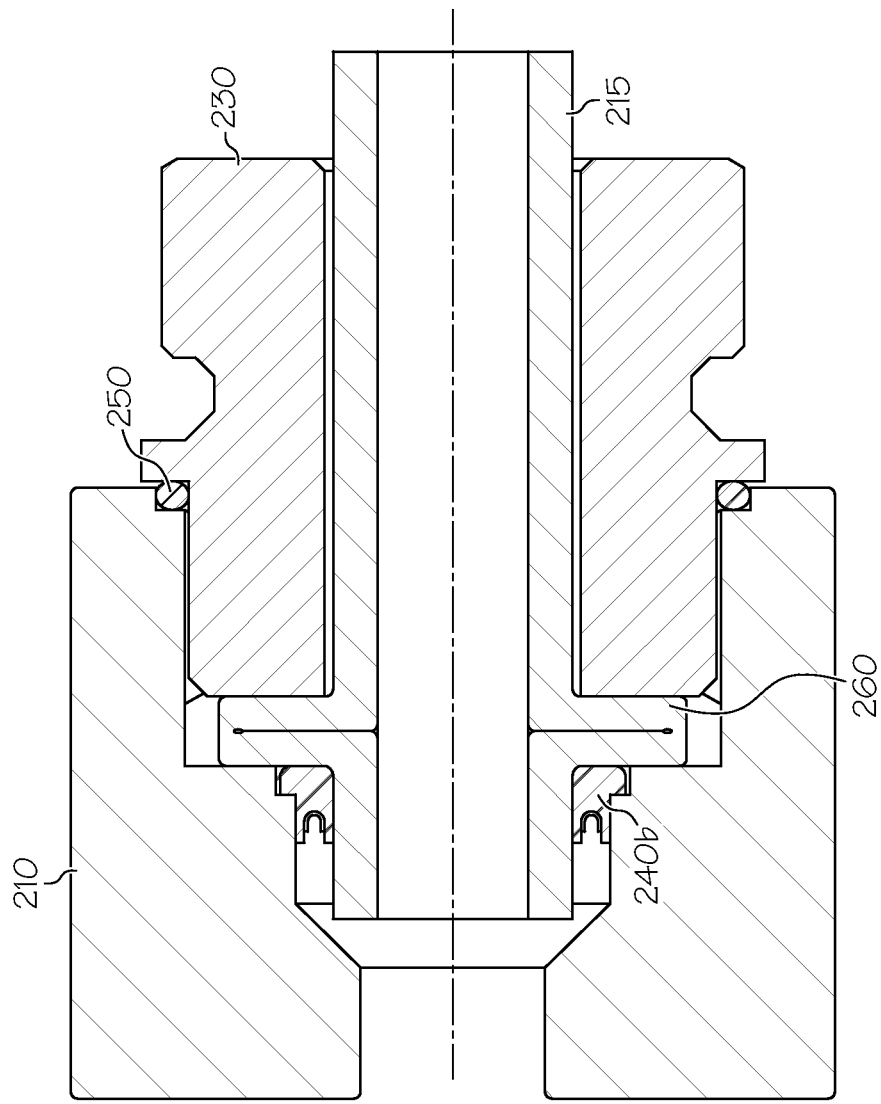

FIGS. 4A-B show the use of the lip seal 240 and protection seal 250 in the embodiment of FIG. 3. In FIG. 4A the flange 260 stops at the lip seal 140, while in FIG. 4B the flange 260 stops at the valve body. The base portion of the lip seal 240a (FIG. 4A) is larger than the base portion of the lip seal 240b (FIG. 4B).

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A high pressure hydrogen fitting comprising:
a pipe having a seal case attached near one end of the pipe by weld, the seal case forming a flange around the pipe;
a nut surrounding the pipe on a low pressure side of the seal case, the nut having threads mating with threads on a valve body;
a seal surrounding the pipe on a high pressure side of the seal case, the flange supporting the seal, the seal comprising (i) a lip seal portion pointing toward the valve body and having a first cylindrical sealing surface and (ii) a base portion having a second cylindrical sealing surface, the cylindrical sealing surfaces engaging the valve body;
the fitting configured to maintain a hydrogen pressure of up to about 87.5 MPa without hydrogen leakage.

2. The high pressure hydrogen fitting of claim 1 wherein a circumference of the flange is substantially the same as a circumference of the seal.

3. The high pressure hydrogen fitting of claim 1 wherein a circumference of the flange is greater than a circumference of the seal, and wherein a portion of the flange engages the valve body.

4. The high pressure hydrogen fitting of claim 1 wherein the seal is made of plastic.

5. The high pressure hydrogen fitting of claim 4 wherein plastic is polytetrafluoroethylene or ultra high molecular weight polyethylene.

6. The high pressure hydrogen fitting of claim 1 further comprising a corrosion protection seal at an outer edge of the threads of the nut.

7. The high pressure hydrogen fitting of claim 6 wherein the corrosion protection seal is made of silicone.

8. The high pressure hydrogen fitting of claim 1 wherein the valve body includes a vent hole, further comprising a protection plug in the vent hole.

9. The high pressure hydrogen fitting of claim 8 wherein the protection plug is made of silicone.

10. A method of sealing a pipe transporting hydrogen to a valve body, comprising:
providing a pipe having near one end a seal case forming a flange around the pipe, a nut surrounding the pipe on a low pressure side of the seal case; the nut having threads mating with threads on the valve body; and a seal surrounding the pipe on a high pressure side of the seal case, the flange supporting the seal, the seal comprising (i) a lip seal portion pointing toward the valve body and having a first cylindrical sealing surface, and (ii) a base portion having a second cylindrical sealing surface; and inserting the pipe into the valve body and engaging the threads on the nut with the threads on the valve body, the cylindrical seal surfaces engaging the valve body to form a seal capable of withstanding a pressure of up to about 87.5 MPa without hydrogen leakage.

11. The method of claim 10 wherein the seal is made of plastic.

12. The method of claim 11 wherein plastic is polytetrafluoroethylene or ultra high molecular weight polyethylene.

13. The method of claim 10 further comprising inserting a corrosion protection seal at an outer edge of the threads of the nut.

14. The method of claim 13 wherein the corrosion protection seal is made of silicone.

15. The method of claim 10 wherein the valve body includes a vent hole, further comprising inserting a protection plug in the vent hole.

16. The method of claim 15 wherein the protection plug is made of silicone.

* * * * *